(12) United States Patent
Iwayama et al.

(10) Patent No.: US 7,693,910 B2
(45) Date of Patent: Apr. 6, 2010

(54) METHOD OF SEARCHING DOCUMENTS AND A SERVICE FOR SEARCHING DOCUMENTS

(75) Inventors: Makoto Iwayama, Kawagoe (JP); Shingo Nishioka, Hatoyama (JP); Yoshiki Niwa, Hatoyama (JP); Akihiko Takano, Higashimatsuyama (JP)

(73) Assignee: Hitachi, Ltd., Tokyo (JP)

( * ) Notice: Subject to any disclaimer, the term of this patent is extended or adjusted under 35 U.S.C. 154(b) by 304 days.

(21) Appl. No.: 10/075,283

(22) Filed: Feb. 15, 2002

(65) Prior Publication Data

US 2002/0078030 A1 Jun. 20, 2002

Related U.S. Application Data

(63) Continuation of application No. 09/442,147, filed on Nov. 18, 1999, now Pat. No. 6,584,460.

(30) Foreign Application Priority Data

Nov. 19, 1998 (JP) .................................. 10-328940

(51) Int. Cl.
*G06F 7/00* (2006.01)
*G06F 17/30* (2006.01)

(52) U.S. Cl. ..................................................... 707/766
(58) Field of Classification Search ................ 707/1–10; 715/500, 513
See application file for complete search history.

(56) References Cited

U.S. PATENT DOCUMENTS

| 5,265,065 | A | * | 11/1993 | Turtle .............................. 707/4 |
| 5,590,319 | A | | 12/1996 | Cohen et al. |
| 5,634,051 | A | * | 5/1997 | Thomson ......................... 707/5 |
| 5,642,502 | A | * | 6/1997 | Driscoll ........................... 707/5 |
| 5,659,732 | A | * | 8/1997 | Kirsch ............................. 707/5 |
| 5,675,710 | A | * | 10/1997 | Lewis ............................ 706/12 |
| 5,826,261 | A | * | 10/1998 | Spencer .......................... 707/5 |
| 5,845,278 | A | * | 12/1998 | Kirsch et al. .................... 707/3 |
| 5,859,972 | A | * | 1/1999 | Subramaniam et al. ..... 709/203 |

(Continued)

FOREIGN PATENT DOCUMENTS

JP 64-74210 3/1989

(Continued)

OTHER PUBLICATIONS

Fitzpatrick et al. Automatic feedback using past queries: social searching? ACM SIGIR Forum 1997.*

(Continued)

*Primary Examiner*—John E Breene
*Assistant Examiner*—Aleksandr Kerzhner
(74) *Attorney, Agent, or Firm*—Brundidge & Stanger, P.C.

(57) ABSTRACT

This invention aims to provide an efficient means of performing a document search wherein relevance between plural document databases is examined. A summary making module and a search module are provided to document databases, and these are connected to a network as a server. A client obtains a relevant set of documents in a specified document database via this summary from a set of documents in the specified document database. The summary obtained is sent to another server, and a search is performed according to the summary in a document database in the server to which the summary is transferred.

5 Claims, 2 Drawing Sheets

U.S. PATENT DOCUMENTS

| | | | |
|---|---|---|---|
| 5,870,740 A | | 2/1999 | Rose et al. |
| 5,873,076 A | * | 2/1999 | Barr et al. .................... 707/3 |
| 5,911,138 A | * | 6/1999 | Li et al. ....................... 707/3 |
| 5,913,215 A | * | 6/1999 | Rubinstein et al. ........... 707/10 |
| 5,926,811 A | | 7/1999 | Miller et al. |
| 5,963,940 A | * | 10/1999 | Liddy et al. .................... 707/5 |
| 5,983,216 A | * | 11/1999 | Kirsch et al. ................... 707/2 |
| 5,987,446 A | * | 11/1999 | Corey et al. .................... 707/3 |
| 5,987,454 A | * | 11/1999 | Hobbs .......................... 707/4 |
| 5,987,460 A | | 11/1999 | Niwa et al. |
| 6,018,733 A | * | 1/2000 | Kirsch et al. ................... 707/3 |
| 6,078,917 A | * | 6/2000 | Paulsen et al. ................. 707/6 |
| 6,108,665 A | * | 8/2000 | Bair et al. ................ 707/104.1 |
| 6,163,782 A | * | 12/2000 | Singhal ................... 707/104.1 |
| 6,212,517 B1 | * | 4/2001 | Sato et al. ...................... 707/5 |
| 6,263,342 B1 | * | 7/2001 | Chang et al. ............. 707/103 R |
| 6,321,228 B1 | * | 11/2001 | Crandall et al. ............... 707/10 |
| 6,347,313 B1 | * | 2/2002 | Ma et al. ....................... 707/3 |
| 6,421,675 B1 | * | 7/2002 | Ryan et al. .................. 707/100 |
| 6,442,540 B2 | * | 8/2002 | Sako et al. ..................... 707/3 |
| 6,457,004 B1 | * | 9/2002 | Nishioka et al. ................ 707/5 |
| 6,457,009 B1 | * | 9/2002 | Bollay .......................... 707/10 |
| 6,480,843 B2 | * | 11/2002 | Li ................................. 707/5 |
| 6,745,177 B2 | * | 6/2004 | Kepler et al. ................... 707/3 |
| 6,745,183 B2 | * | 6/2004 | Nishioka et al. ................ 707/5 |
| 2002/0147880 A1 | * | 10/2002 | Wang Baldonado ............ 711/1 |

FOREIGN PATENT DOCUMENTS

| | | |
|---|---|---|
| JP | 4-138563 | 5/1992 |
| JP | 8-287103 | 11/1996 |
| JP | 9-62693 | 3/1997 |
| JP | 9-218881 | 8/1997 |
| JP | 10-74210 | 3/1998 |
| JP | 10-254887 | 9/1998 |
| JP | 10-269237 | 10/1998 |
| JP | 11-85786 | 3/1999 |
| WO | 93/37499 | 8/1998 |

OTHER PUBLICATIONS

By C Buckley—1995. Automatic Query Expansion Using SMART : TREC 3.*

SenseMaker: an information-exploration interface supporting the contextual evolution of a user's interests. Baldonado et al. ACM pub. 1997.*

L Rosenfeld, P Morville—1998. Information architecture for the World Wide Web. 2nd. edition O'Reilly.*

C Buckley—1995. Automatic Query Expansion Using SMART : TREC 3.*

"Dynamic Co-occurrence Analysis for Interactive Document Retrieval", by Yoshiki Niwa, Advanced Research Laboratory, Hitachi, Ltd., pp. 41-48 (including English-Language Translated Abstract).

"Searching, Browsing, and Metasearching with SenseMaker—Seek and Ye Shall Find", by Michelle Q. Wang Baldonado, New.Architect Internet Strategies for Technology Leaders, pp. 31-36, (including English-language Translated Abstract pp. 1-4).

B. Velez et al, "Fast and Effective Query Refinement", Annual International ACM-SIGIR Conference on Research and Development in Information Retrieval, US, New York, NY, Jul. 27, 1997, pp. 6-15.

* cited by examiner

METHOD OF SEARCHING DOCUMENTS AND A SERVICE FOR SEARCHING DOCUMENTS

This is a continuation application of U.S. Ser. No. 09/442,147 filed Nov. 18, 1999 now U.S. Pat. No. 6,584,460.

BACKGROUND OF THE INVENTION

This invention relates to a document searching method for changing over between plural document databases, and constructing relationships between plural document databases.

As more and more document information is converted to electronic format, a greater need is emerging to search different types of document database simultaneously. For instance, users often wish to look up dictionaries relating to newspaper articles which they may find of interest.

In the past, it was possible to perform a search independently by changing over between plural document databases, but there was no way of examining the relevancy of sets of documents in other databases to a set of documents in one particular database.

If however the search is limited to the same document database, it is possible to search other document sets within that database. In this case, sufficient search speed is often obtained by calculating the relevance between documents before searching. Even with different databases, it is possible to search plural document databases at the same time if such a calculation is performed beforehand, but since the need for calculation increases as the number of databases increases due to increasing numbers of combinations, this method is not realistic.

It is also possible to first analyze the set of key documents on the user side to compose a search input, and then search in other document databases by using the input, but in this case, the user side has to receive all the information about the set of key documents, and if the document databases are on a network, the amount of traffic would be huge.

SUMMARY OF THE INVENTION

It is therefore an object of this invention to resolve the problems inherent in existing technology by allowing a user to specify an arbitrary set of documents in an arbitrary document database, and to efficiently search sets of documents relating to this set of documents from within any particular database.

When there is a large search input as in the case of a set of key documents, instead of using all the information in the search input, it is faster to perform a search using only topic words of the search input as a summary, and this also reduces the load on the network. In the context of this specification, "summary" means a "set of topic words for a set of documents".

The document databases are located on servers on a network comprising a module for building a summary by selecting topic words for a set of documents within the document database, and a module for performing a search on any arbitrary summary.

A user who performs a search specifies a set of documents via a client to a server in which an source document database is stored, and receives a summary.

Next, the summary is sent to a server where a target document database to be searched is located, and a search result is received.

As the search interface of the client, a display area for a set of documents is first provided wherein the required set of key documents can be specified, and the database to be searched can also be selected. In the client, the user then selects an interesting set of documents from among a set of documents displayed in this display area, and if necessary, changes over the document database which is to be searched.

These and other objects, features and advantages of the present invention will become more apparent in view of the following detailed description of the preferred embodiments in conjunction with the accompanying drawings.

DESCRIPTION OF THE PREFERRED EMBODIMENTS

Figure 1:
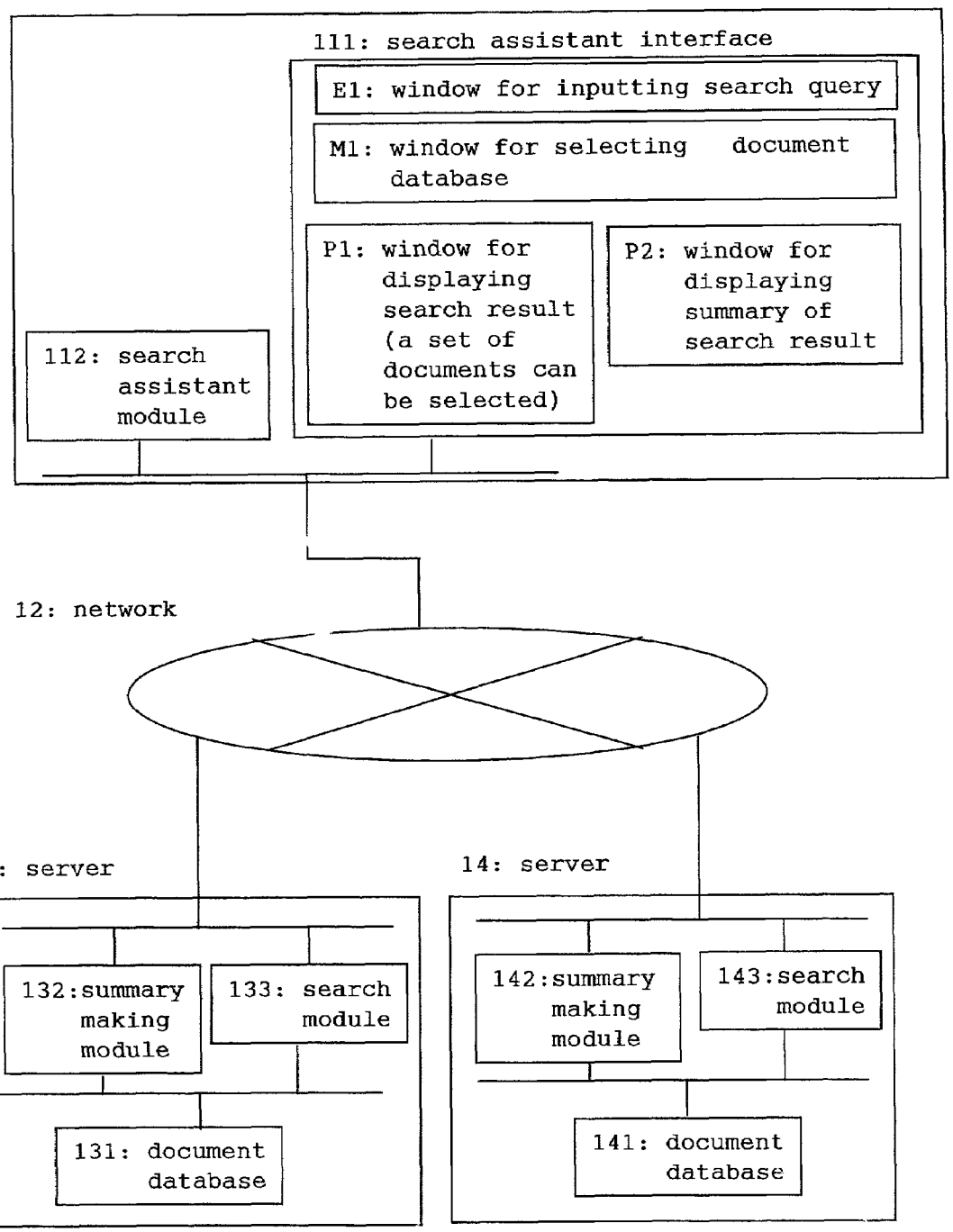
FIG. 1 is a diagram showing an example of the overall construction of a system implementing the plural document database search method.

FIG. 1 shows a typical general arrangement wherein a client 11 specifies an arbitrary set of key documents in a document database 131 of a server 13, and obtains a set of documents having a high relevance (similarity) to the specified set of key documents from a document database 141 of another server 14. Herein, the source and target document databases 131, 141 are located on servers in different places which can be respectively accessed via a network 12.

First, the client 11 specifies a set of key documents in the source document database 131 according to user's specification, and sends this information to the server 13 as a set comprising a document identifier, for example an ID attached to each document which the server 13 can understand, via the network 12. The set of documents is specified in a window for displaying search results P1 described later.

The server 13 identifies a set of documents which were sent from the client. A summary of the set of documents is then made for the searched set of documents by a summary making module 132, and this is sent back to the client 11 via the network 12. Herein, the term "summary" means a set of topic words relating to a set of documents. The summary making module can be constructed by any of the known methods such as that disclosed in Japanese Patent Laid-Open No. Hei 9-62693, "Method of Document Classification by Probability Model".

As an example, word frequencies are first totaled by splitting up all the documents in the set of documents for which it is desired to make a summary, into words. In general, as the degree to which a given set of documents is represented by particular words is higher for words which appear more frequently within it, words will tend to be included in the summary more frequently the higher their occurrence frequency is in the set of documents. However, general words which often appear in all documents such as "do", etc., are not suitable for the summary. Therefore, words are usually selected for inclusion in the summary by considering also their appearance frequency in the document database to which the set of documents belongs. Specifically, desirable words are topic words having a high occurrence frequency in a specified set of documents but a low overall frequency in the document database overall, i.e., they are suitable for a summary characterizing the set of documents. Hence, words are selected for the summary by calculating their weighting from suitable parameters using the occurrence frequency in the set of documents and the occurrence frequency in the document database as input, and adopting words having a weighting equal to or greater than a certain threshold.

The higher the weighting, the higher the relevance of the word to a given document, and the lower the weighting, the lower the relevance of the word to the document.

The server 13 returns a set of words having a weighting calculated by the above-mentioned method to the client via the network 12. These words are displayed as "topic words" in FIG. 2.

Next, at the client 11, users evaluate or process the summary (summary of the set of key documents) from the server 13, and the client 11 transmits it to the target server 14 via the network 12.

In the evaluation or the processing performed by users at the client, users for example remove words which are not deemed to be relevant from the summary, or users for example replace words in the summary.

Using the search module 143, the server 14 calculates the relevance of the summary of the set of key documents sent from the client to the target document database 141, and returns document identifiers of high relevance to the client 11 with a relevance weighting. The search module here can be implemented by a keyword search known in the art. Specifically, as the summary of the set of documents which is input is a set of words with weightings, these words may be considered as weighted input keywords and an OR keyword search performed. In this case, the weighting (relevance) of the document which is the search result can be calculated. This is done by taking words which appear both in the summary and the document to be searched, calculating an overall weighting from their weighting in the summary and their weighting in the document to be searched (e.g., product of the two weightings), and then adding up the weightings of all the words (e.g., calculating a sum total) to obtain the relevance.

Using the above method, the client 11 can obtain a set of documents in the document database 141 which relates to an arbitrary set of key documents in the document database 131. The characteristic feature of this method is that network traffic is reduced to a small amount by leaving the processing (summary making) of the original set of documents searched to the server side. It will be appreciated that the amount of traffic is much less than in the case where the client has to receive and process all of the document information to be searched. The search assistant module 112 of the client then basically has only to send the summary of the set of documents from the source server to the target server, and almost all of the processing involved in the search can be left to both servers. Moreover, the server side merely has to have a summary making module and a search module for the document database in question, and it is therefore completely unnecessary to consider information in other document databases.

In the aforesaid description, a method was described wherein the document database 131 was the source database and the document database 141 was the target database, but the same method can be adopted wherein the document database 141 is the source database and the document database 131 is the target database. In this case, the client obtains a summary of the set of key documents from a summary making module 142 of the server 14, transmits it to the server 13 which is to be searched, and obtains relevant documents in the document database 131 from the search module 133 of the server 13. If the above is generalized, and a server with a summary making module and a search module is provided for a new document database, this document database can be made to function as the source database or target database for all document databases connected to the network simply by connecting the server to the network.

In FIG. 1, the summary making module and search module (132, 133, and 142, 143) were respectively located in different servers (13, 14), but this embodiment of the invention is not limited to this particular arrangement. For example, the summary making module and search module may be installed in a different server from the document database, and a summary making module and search module provided by this server for plural databases.

Figure 2:
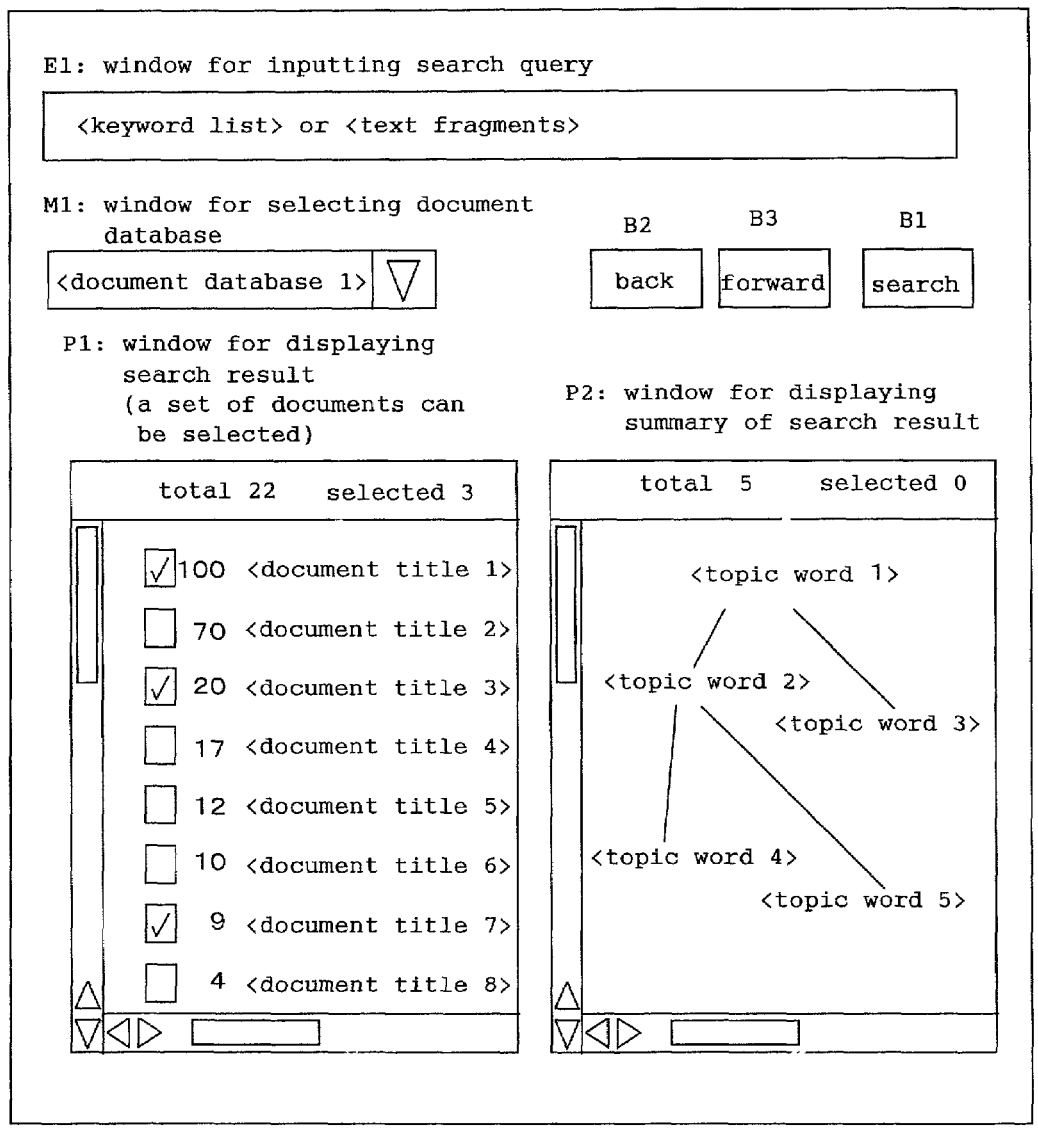
FIG. 2 is a diagram showing an example of the construction of a search assistant interface in a client.

Finally, FIG. 2 shows an embodiment concerning the client. 111 is an example of a search assistant interface installed in the client. This is basically the same as the interface proposed by the inventor of the present application in Japanese Patent Laid-Open No. Hei 11-85786, "Document search support method and document search support service" (corresponding to U.S. patent application Ser. No. 09/145,155, filed Sep. 1, 1998 by Nishioka et al), or Japanese Patent Laid-Open Hei 10-74210, "Document search support method and device, and document search service using same", (corresponding to U.S. patent application Ser. No. 08/888,017, filed Jul. 3, 1997 by Niwa et al). E1 is a window for inputting a search query, wherein the user can input a search query by a string of keywords or in the form of a sentence. M1 is a window for selecting a document database wherein the user can pull down a specific part on the right edge with a mouse to show a list of document databases, and select a desired document database. B1 is a search button which initiates a search. Therefore, the user inputs an arbitrary search query in the window E1, selects a document database to be searched in the window M1, and performs an ordinary search by keywords input to the window E1 concerning the document database selected in the window M1, by pressing the button B1. This search is performed with the support of the search assistant module 112 shown in FIG. 1, but as the details of the search method were given in the previous application, they will not be repeated here.

P1 is a window for displaying a search result. In the upper part, a panel showing the total number of documents retrieved as a result of the search process and a number of documents selected by the user as described hereafter, is displayed. Underneath this, a panel is provided for the user to specify selected/not selected(P13), and a document title part showing the relevance(P12) to the search query and titles(P11) of documents displayed in the form of a list. This display window has a scroll function so that, by scrolling, the user can see a part which cannot be displayed in the display at one time. In the selected/not selected panel, documents are either selected or deselected each time there is a mouse click. When documents are selected by clicking, a summary of the corresponding documents is displayed as a graphical representation of a set of words with weightings in a summary display window P2. The summary display window P2 also has a panel in its upper part where the total number of topic words and the number of topic words selected by the user are displayed. Document titles are usually sorted in order of relevance.

The window P1 for displaying the search result in the diagram shows that a total of 22 documents were retrieved as a result of the search, and that three documents were selected by the user as interesting documents judging from their titles. The selected documents are given a check mark by clicking. In the summary display window P2, five topic words are accordingly displayed corresponding to the selected documents.

Although omitted from this embodiment, conversely, documents for which the topic words selected in the summary display window P2 are representative, can be displayed in the window P1. Therefore, the user can perform a more advanced search by making a summary customized according to his preference. This is explained in detail in the aforesaid reference Japanese patent laid open Hei 11-085786.

Hence, the user can select/deselect documents while referring to the titles and the topic words of selected documents, and can select plural documents in which he is interested.

Subsequently, if the user is interested in handling other document data for the set of documents corresponding to this search result, he may change the document database in the window M1, and press the button B1 to begin a new search.

Hence, the client sends an identifier of the plural documents selected to the server where the source document database is stored (for example, the server 13), obtains a summary of these plural documents, sends this summary to the server where the target document database is stored (for example, the server 14), and obtains a search result from the target server (for example, the server 14). The new search result is displayed in the window P1. In other words, in this case, P1 is updated by the set of documents which was newly searched.

To compare a new search result with a previous search result, the user may press a back button B2 to re-display the previous search result in the window P1, and return the display of the window P1 to its state before search was performed. Likewise, the window P1 can be advanced to the new search result by pushing a forward button B3.

As the user can search other document databases corresponding to such a search result at any stage of the search, the user can freely proceed from one database to another database by repeating the search cycle. Naturally, it is also possible to repeat this cycle within the same document database, i.e., without changing the document database.

According to this invention, the user can freely specify a document database to be searched and freely enhance the search without concern for the location or composition of each document database. Further, as a server in which a document database is located can be modularized, the server can be made to function as an source database or a target database with respect to all other databases connected to a network simply by connecting a server comprising a summary making module and a search module to the network when it is desired to search new document databases.

While the present invention has been described above in conjunction with the preferred embodiments, any person skilled in the art would be enabled by this disclosure to make various modifications to this embodiment and still be within the scope and spirit of the invention as defined in the appended claims.

What is claimed is:

1. A computer implemented service of searching documents wherein servers comprising document databases and programs to manipulate said databases are dispersed over a network and a client connected to said servers performs a document search, said service providing a document search method comprising the steps of:

making a first search input of a set of keywords, fragments of a document or any desired set of documents to a first document database;

conducting a first search of said first document database based on said first search input;

retrieving at least one document from said first document database as a result of said first search;

selecting and inputting at least one of said at least one retrieved document to said first document database;

making a weighted term list, whereby each term is given a first weight, from said at least one inputted document, the first weight of each term reflecting the importance of the term in the first document database; wherein a user interface is provided in which any of said at least one document retrieved by said first search is selected or deselected, and a set of said at least one document that is selected via said interface is used in making the first weighted term list; and selecting at least one term from said weighted term list, conducting a second search of a second document database which differs from said first document database using said at least one term selected from said weighted term list as a second search input for performing said second search;

retrieving at least one document from said second document database as a result of said second search, calculating a second weight of each term used as the second search input, which reflects the importance of each said term, to each document retrieved from the second document database by the second search;

finding out a relevance of each document retrieved from the second document database by calculating an overall weight on both said weighted term list and the calculated second weights for each document with respect to terms common in both; and displaying results of said finding step on a display unit.

2. The computer implemented service of searching documents as defined in claim 1, wherein the client transmits the set of said at least one document selected via said interface to a first server where said first document database is stored, receives the weighted term list from said first server, sends the second search input to a second server where said second document database is stored, and receives the result from the second search of said second document database.

3. The computer implemented service of searching documents as defined in claim 2, wherein the client sends the second search input corresponding to said summary reflecting a user's evaluation of the summary to a second server where said second document database is stored; the second server calculates the second weight of each term; the second server finds out the relevance of each document derived from the second document database; and the client receives the search result from the search of said second document database in accordance with the relevance.

4. A computer implemented service of searching documents wherein servers comprising document databases and programs to manipulate said databases are dispersed over a network and a client connected to said servers performs a document search, said service providing a document search method comprising the steps of:

making a first search input of a set of keywords, fragments of a document or any desired set of documents to a first document database;

conducting a first search of said first document database based on said first search input;

retrieving at least one document as a result of said first search;

selecting and inputting at least one of said at least one retrieved document to said first document database;

making a weighted term list, whereby each term is given a first weight, from said at least one inputted document, the first weight of each term reflecting the importance of the term in the first document database;

selecting at least one term from said weighted term list;

conducting a second search of a second document database which differs from said first document database using said at least one term selected from said weighted term list as a second search input for performing said second search;

wherein the client transmits said at least one document to a first server where said first document database is stored, receives the weighted term list from said first server, sends the second search input to a second server where said second document database is stored, receives the result of the second search of said second document database, and calculates a second weight of each term used as the second search input, which reflects the importance of each said term to each document in the result of the second search;

using said weighted term list and the calculated second weights to determine a relevance of each document in the result of the second search; and displaying results of said using step on a display unit.

5. The computer implemented service of searching documents as defined in claim 4, wherein the client has a user interface in which any of said at least one document retrieved by said first search is selected or deselected, and in which document databases are selected to be searched, a set of said at least one document thus selected is sent to the first server as specified by the user, the weighted term list of the set of documents is received from said first server, and the received weighted term list is sent to the second server comprising said second document database.

* * * * *